Patented Jan. 31, 1933

1,895,490

UNITED STATES PATENT OFFICE

SAMUEL RUBEN, OF NEW ROCHELLE, NEW YORK

GAS ABSORPTION ELEMENT

No Drawing.    Application filed February 10, 1932.    Serial No. 592,195.

This invention relates to an absorption or getter element for highly evacuated containers. The object of this invention is the provision of a low cost element by means of which a high degree of gas absorption is obtained in electron discharge devices.

The requirements for a getter or gas absorption agent in such highly evacuated containers as vacuum tubes, and particularly such as the triodes used in the radio art, are that (1) It should require a high temperature for vaporization so that it will not prematurely sputter, during the heating of the elements within the tube;

(2) It should under any atmospheric conditions be chemically stable so as not to form compounds prior to its use as a gas absorber;

(3) It should have a residual low vapor pressure so that when a high voltage is applied for an electric discharge between the other elements, the getter will not cause ionization by reason of its vapor;

(4) It should not evolve gases during the vaporization and thereby cause a reduction of its effectiveness;

(5) It should be low in cost and have a high absorption factor, both chemical and physical;

(6) It should preferably have two decomposition temperatures in order that it may act as a getter while the container is connected with the evacuation pump, and then be finally dissociated or vaporized at a higher temperature when the tube is sealed off.

I have found that a silicide of the alkaline earth metals of the second periodic group, calcium, magnesium, barium and berylium, meets the above requirements in a greater degree than do any of the materials now used in the art. For such use I prefer a silicide of calcium or magnesium, only these compounds being referred to hereinafter in the description of the invention.

For use in the commonly employed vacuum tubes of the radio art I employ nickel capsules containing a small body of one of these getters, magnesium silicide being preferable for this application. But where higher temperatures are to be used the getter is composed of calcium silicide in a molybdenum capsule.

The dissociation or vaporization temperature for magnesium silicide is 1150° C. When in a vacuum the material volatilizes over and settles upon the inner wall of the container and effectively absorbs any residual gases or vapors, thus allowing a high vacuum to be obtained and maintained.

The magnesium silicide ($Mg_2 Si$) or magnesium hemi-silicide has an important manufacturing advantage as it vaporizes at two temperatures, one at about 800° C. when the magnesium vaporizes, and magnesium silicide ($MgSi$) is produced. The $MgSi$ is then dissociated and vaporized at the higher temperature or 1150° C. This aids materially in the rapid production of high vacuum tubes as the lower temperature can be employed for the final cleaning up of gases or vapors while the container is connected with the evacuation pump, and after the tube is sealed off the getter is heated to 1150° C. when the final decomposition and vaporization occurs, and all of the gases evolved during the process of aging or sealing off are then absorbed.

The magnesium and calcium silicides are made by heating magnesium and silicon and calcium and silicon respectively, in powdered form to their re-acting temperatures, in an inert atmosphere. The crystal of the silicide in a metal capsule is then mounted adjacent the other elements within the tube in a manner well known in the art. The capsule containing the getter is heated to dissociation and vaporization temperature when the silicide volatilizes, probably both as silicide and free magnesium or calcium to the container walls.

What I claim is:

1. In combination with an electron discharge device an element for absorbing gases comprising a body composed of a compound of silicon and an element of the alkaline earth metals of the second periodic group.

2. In combination with an electron discharge device a gas occluding element comprising a body of a compound of magnesium and silicon.

3. In combination with an electron discharge device a gas occluding element comprising a body of a compound of calcium and silicon.

4. In combination with an electron discharge device an element for absorbing gases comprising a body of magnesium silicide.

5. In combination with an electron discharge device an element for absorbing gases comprising a body of calcium silicide.

Signed at New York in the county of New York and State of New York this 9th day of February A. D. 1932.

SAMUEL RUBEN.